3,647,798
PIGMENTS OF THE PERYLENE TETRACARBOXYLIC ACID DIIMIDE SERIES
Georg Anton Klein, Bottmingen, Basel-Land, Switzerland, assignor to Ciba-Geigy AG, Basel, Switzerland
No Drawing. Filed Oct. 24, 1969, Ser. No. 869,367
Claims priority, application Switzerland, Nov. 5, 1968, 16,460/68
Int. Cl. C07d 55/06
U.S. Cl. 260—281  9 Claims

ABSTRACT OF THE DISCLOSURE

N,N'-bis-(1,2,4-triazol-5-yl)-perylene - 3,4,9,10 - tetracarboxylic acid diimide optionally substituted in 3-position of the triazole rings are disclosed. The claimed compounds are highly valuable pigments which are distinguished by good fastness to heat, light, migration, overvarnishing and solvents. Their use in high-molecular organic material, e.g. lacquers, plastic materials, spinmasses for synthetic fibres or printing pastes, are described.

---

The invention concerns novel pigments of the perylene tetracarboxylic acid diimide series, a process for the production thereof, and the use of these pigments for pigmenting high-molecular organic material.

Pigments of the perylene tetracarboxylic acid diimide series are known; few of them, however, are technically useful. Surprisingly, it has now been found that compounds of the formula

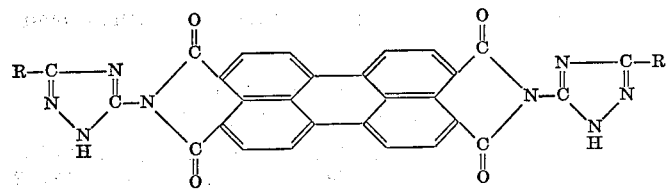

(I)

in which R represents hydrogen, an alkyl group having 1 to 3 carbon atoms or an optionally substituted phenyl group, in particular however the methyl group, are highly valuable pigments which are distinguished by good fastness to heat, light, migration, overvarnishing and solvents.

When the substituent R represents a substituted phenyl group, substituents thereof are halogen, preferably chlorine or bromine, and/or alkyl and/or lower alkoxy groups, such lower aliphatic groups having from 1 to 4 carbon atoms.

The compounds are produced according to the invention by condensation of perylene-3,4,9,10-tetracarboxylic acid or a reactive acid derivative thereof, in particular the anhydrides, with a 3-amino-1,2,4-triazole which is in its 5-position unsubstituted or substituted by a lower alkyl group or an optionally substituted phenyl group. For this reaction, if necessary, condensation agents are used, such as hydrochloric acid, concentrated acetic acid, anhydrous zinc chloride, or zinc or cadmium salts of organic carboxylic acids, e.g. zinc formate, zinc acetate, zinc stearate, cadmium acetate or the zinc salts of benzoic acid, phthalic acid, phenyl acetic acid and nicotinic acid. Zinc acetyl acetonate is particullarly suitable for this purpose; when it is present, the reaction proceeds rapidly and with a good yield. In general, 0.1 to 1 mol of zinc acetyl acetonate per mol of perylene tetracarboxylic acid is used for the condensation; more of the condensation agent, however, can be added. Preferably the condensation is performed in high-boiling solvents such as quinoline, trichlorobenzene, diphenylene oxide, diphenyl, or mixtures thereof. When pyridine is used, it is advantageous to perform the condensation above the normal boiling point in pressure vessels, expediently at 200 to 230° C.

The novel compounds according to the invention are suitable for the coloring of high-molecular organic materials, for example for the pigmenting of lacquers, also metallic effect lacquers, plastic materials such as hard or plasticizer-containing polyvinyl chloride, polyurethane, polycarbonate, polystyrene, polyacrylonitrile; for the spin-dyeing of synthetic fibers; or as printing paste. The pigment can be used directly or after preparing it in a finely divided form. The compound can also be used as vat dye.

In the following non-limitation examples, the temperatures are given in degrees centigrade.

EXAMPLE 1

(a) To a flask fitted with thermometer, stirrer and distillation attachment and containing 150 g. of quinoline, 10.6 g. of zinc acetonyl acetonate are added with stirring; the flask is heated to about 237° until pure quinoline distills off and then cooled to 200°. Then 8.0 g. of perylene-3,4,9,10-tetracarboxylic acid dianhydride is added and heated to the boiling point of the quinoline; 8.0 g. of 3-amino-5-methyl-triazole-1,2,4 is added to the 200° hot suspension and stirred for 30 to 45 minutes between 200 and 210°. The mixture is then cooled to 100°, filtered by suction under a vacuum of 15 mm. Hg, and the red residue is washed with 250 ml. of methanol. After bringing to the boil in 100 ml. of o-dichlorobenzene, it is filtered hot with a water-jet vacuum pump, washed with 50 ml. of o-dichlorobenzene and 200 ml. of methanol and dried in vacuum at 60°.

The 14.3 g. of N,N-bis-(3-methyl-1,2,4-triazol-5-yl)-perylene-3,4,9,10-tetracarboxylic acid diimide thus obtained are ground for two hours in a ball mill (1 liter having 3.6 kg. of steel balls of 1.5 cm. diameter) with 70 g. of calcium chloride and 5.5 g. of special petroleum (B.P. 165–200°). Then the ground material is suspended in 500 ml. of 1 N hydrochloric acid, stirred for one hour at 80°, then filtered with a water-jet vacuum pump, washed with 1 liter of hot water and dried in vacuum at 60°. There are thus obtained 11 g. of a bluish red pigment having excellent fastness to light, migration, overvarnishing, heat and solvents.

Bluish red pigments of equal quality are obtained when the 8 g. of 3-amino-5-methyl-triazole-1,2,4 are replaced by an equivalent amount of one of the following compounds:

(b) 3-amino-5-ethyl-1,2,4-triazole,
(c) 3-amino-1,2,4-triazole,
(d) 3-amino-5-propyl-1,2,4-triazole.

EXAMPLE 2

(a) In a round-bottomed flask fitted with a distillation attachment, 150 g. of quinoline, 2.3 g. of zinc acetate, 4.0 g. of perylene tetracarboxylic acid-3,4,9,10-dianhydride and 4.0 g. of 3-amino-5-phenyl-1,2,4-triazole are heated to 230° and kept for 30 minutes between 210 and 220°. Then the reaction mixture is cooled to 100°, filtered through a suction filter at a vacuum of 15 mm. Hg; the residue is washed out with three portions of methanol of 50 ml. each, then boiled in 100 ml. of glacial acetic acid for 10 minutes, removed by filtration, washed with 200 ml. of hot water and dried for 12 hours at 60° in a vacuum of 15 mm. Hg.

After being treated as described in Example 1, paragraph 2, 5.6 g. of pigment are obtained which has very good properties.

Beautiful bluish red pigments of similar quality and in good yield are also obtained when in the above-described procedure, the 3-amino-5-phenyl-1,2,4-triazole is replaced by an equivalent amount of (b) 3-amino-5-(p-chloro-phenyl)-1,2,4-triazole,
(c) 3-amino-5-(p-methoxy-phenyl)-1,2,4-triazole,
(d) 3-amino-5-(p-methyl-phenyl)-1,2,4-triazole,
(e) 3-amino-5-(p-bromo-phenyl)-1,2,4-triazole,
(f) 3-amino-5-(2-methyl-4-chloro-phenyl)-1,2,4-triazole,
(g) 3-amino-5-(2-methoxy-5-chloro-phenyl)-1,2,4-triazole,
(h) 3-amino-5- 2,4-dimethyl-phenyl)-1,2,4-triazole,
(i) 3-amino-5-(2-methyl-4-methoxy-phenyl)-1,2,4-triazole.

EXAMPLE 3

4 g. of N,N'-bis-(3-phenyl-1,2,4-triazolyl-5)-perylene tetracarboxylic acid-3,4,9,10-diimide, 36 g. of aluminum hydroxide, 60 g. of linseed oil varnish of medium viscosity and 0.2 g. of cobalt linoleate are mixed and ground on a three-roller mill. A printing ink is obtained which produces bluish red prints on paper having good light fastness.

EXAMPLE 4

To 100 g. of a stoving lacquer consisting of 58.5 g. of a 6% solution of a coconut fatty acid alkyd resin in xylene, 23 g. of a 65% solution of a melamin resin in butanol, 17 g. of xylene and 1.5 g. of butanol, there are added 1 g. of the pigment produced according to Example 1 and 5 g. of titanium dioxide. After grinding the mixture for 48 hours in a ball mill, the lacquer thus pigmented is sprayed onto a cleaned metal surface. The bluish red coating, after stoving at 120°, has very good fastness to light, overlacquering and weathering.

EXAMPLE 5

6.7 g. of polyvinyl chloride powder (suspension polymerizate), 33 g. of dioctyl phthalate, 2 g. of dibutyl tin dilaurate, 0.3 g. of a phosphate stabilizer, and 0.7 g. of the pigment obtained according to Example 1 by condensing perylene tetracarboxylic acid-3,4,9,10-dianhydride and 3-amino-5-methyltriazole-1,2,4 are mixed and worked up for 15 minutes on a set of mixing rollers having a temperature of 160°. Then a sheeting 0.4 mm. thick is formed on a sheeting calender. The bluish red coloring is heat stable and fast to migration and light.

I claim:
1. A pigment of the formula

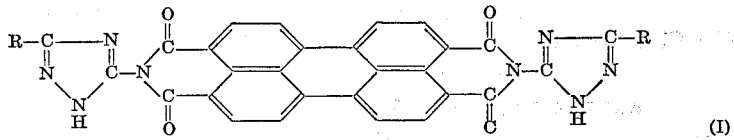

in which R represents hydrogen, of from 1 to 4 carbon atoms, or a phenyl radical any substituent of which is selected from lower alkyl, lower alkoxy and halogen.

2. A compound as defined in claim 1, wherein R represents methyl.
3. A compound as defined in claim 1, wherein R represents hydrogen.
4. A compound as defined in claim 1, wherein R represents ethyl.
5. A compound as defined in claim 1, wherein R represents phenyl.
6. A compound as defined in claim 1, wherein R represents p-chloro-phenyl.
7. A compound as defined in claim 1, wherein R represents p-methyl-phenyl.
8. A compound as defined in claim 1, wherein R represents p-methoxy-phenyl.
9. A compound as defined in claim 1, wherein R represents p-bromo-phenyl.

References Cited

UNITED STATES PATENTS

| | | | |
|---|---|---|---|
| 3,357,983 | 12/1967 | Weener et al. | 260—281 |
| 3,332,931 | 7/1967 | Braun | 260—281 X |
| 3,546,222 | 12/1970 | Irving et al. | 260—249.6 |

FOREIGN PATENTS

| | | | |
|---|---|---|---|
| 894,859 | 4/1962 | Great Britain | 260—281 |

DONALD G. DAUS, Primary Examiner

U.S. Cl. X.R.

8—34; 106—288 O; 260—37 NP, 37 N, 308 R